US 12,070,836 B2

(12) United States Patent
Müller

(10) Patent No.: US 12,070,836 B2
(45) Date of Patent: Aug. 27, 2024

(54) SECURING APPARATUS FOR SECURING A VALVE LEVER IN A SET POSITION

(71) Applicant: ABUS August Bremicker Söhne KG, Wetter-Volmarstein (DE)

(72) Inventor: Thomas Müller, Bischoffen (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 317 days.

(21) Appl. No.: 16/885,528

(22) Filed: May 28, 2020

(65) Prior Publication Data
US 2020/0378525 A1 Dec. 3, 2020

(30) Foreign Application Priority Data
May 28, 2019 (DE) .......................... 102019114349.7

(51) Int. Cl.
*F16K 35/10* (2006.01)
*B25B 1/10* (2006.01)
(Continued)

(52) U.S. Cl.
CPC .............. *B25B 1/103* (2013.01); *F16K 35/10* (2013.01); *B25B 5/102* (2013.01); *F16K 35/06* (2013.01);
(Continued)

(58) Field of Classification Search
CPC ........... B25B 5/10; B25B 5/101; B25B 5/102; B25B 1/10; B25B 1/103; B25B 1/125;
(Continued)

(56) References Cited

U.S. PATENT DOCUMENTS 89,671 A * 5/1869 Lewis ..................... B25B 5/101
269/248
105,588 A * 7/1870 Mitchell ................. B25B 5/101
269/248
(Continued)

FOREIGN PATENT DOCUMENTS

CN   204533777 U   8/2015
CN   208750128 U   4/2019
(Continued)

OTHER PUBLICATIONS

Brady Part 66321, Universal Multi-Pole Breaker Lockout, Internet printout of May 28, 2019, https://www.bradyid.com/en-us/product/66321; pp. 1-2.
(Continued)

*Primary Examiner* — Kevin F Murphy
*Assistant Examiner* — Jonathan J Waddy
(74) *Attorney, Agent, or Firm* — Dickinson Wright PLLC

(57) ABSTRACT

A securing apparatus for securing a valve lever in a set position comprises a base body; a sliding piece; and a screw element, wherein the base body and the sliding piece each have a clamping surface; wherein the sliding piece is displaceably supported at the base body along a longitudinal axis; and wherein the screw element is rotatably supported at the base body and has a thread that is in engagement with a mating thread of the sliding piece so that a position of the sliding piece relative to the base body along the longitudinal axis is restricted to a maximum spacing between the clamping surfaces that can be changed by a rotation of the screw element in order to clamp the valve lever between the clamping surfaces. Depending on a rotational position of the screw element, a blocking receiver formed at the screw element is aligned with a blocking receiver formed at the base body so that a blocking element, in particular a cable, (Continued)

can engage into both blocking receivers in order to block the screw element in this rotational position.

22 Claims, 3 Drawing Sheets

(51) Int. Cl.
  *B25B 5/10* (2006.01)
  *F16K 35/06* (2006.01)
(52) U.S. Cl.
  CPC .......... *Y10T 70/411* (2015.04); *Y10T 70/5624* (2015.04); *Y10T 137/7256* (2015.04)
(58) Field of Classification Search
  CPC .......... F16K 35/00; F16K 35/06; F16K 35/10; F16K 7/06; F16K 7/061; F16K 7/14; F16K 7/16; E05B 67/383; Y10T 70/411; Y10T 70/5611; Y10T 70/5615; Y10T 70/5619; Y10T 70/5624; Y10T 137/7256
  USPC .................................. 251/89, 90; 269/43, 86
  See application file for complete search history.

(56) References Cited

U.S. PATENT DOCUMENTS

| | | | | |
|---|---|---|---|---|
| 396,066 | A * | 1/1889 | Blake | B25B 5/101 269/174 |
| 399,014 | A * | 3/1889 | Brown | B25B 5/101 269/174 |
| 948,980 | A * | 2/1910 | Tischler | B25B 5/101 269/2 |
| 1,313,256 | A * | 8/1919 | Cannon | B25B 1/103 269/240 |
| 2,271,475 | A * | 1/1942 | Clade | F16K 35/10 70/180 |
| 4,043,547 | A * | 8/1977 | Glomb | B25B 1/125 269/244 |
| 4,431,174 | A * | 2/1984 | Varden | B25B 1/125 269/211 |
| 4,932,643 | A * | 6/1990 | Rohm | B25B 1/103 269/244 |
| 5,131,780 | A * | 7/1992 | Love | B25B 5/101 24/522 |
| 5,213,308 | A * | 5/1993 | Jeromson | F16K 35/06 70/180 |
| 5,300,740 | A | 4/1994 | Benda | |
| 5,320,444 | A * | 6/1994 | Bookwalter | F16B 2/12 606/151 |
| 5,586,373 | A * | 12/1996 | Eby | B25B 1/103 296/167 |
| 5,649,694 | A * | 7/1997 | Buck | B25B 1/2473 269/154 |
| 6,032,939 | A * | 3/2000 | Chen | B25B 1/103 269/251 |
| 6,617,532 | B1 * | 9/2003 | Turek | H01H 9/283 200/43.14 |
| 6,722,643 | B1 * | 4/2004 | Kurtz | B25B 5/102 269/95 |
| 7,207,198 | B2 | 4/2007 | Benda | |
| 7,262,376 | B2 | 8/2007 | Brojanac et al. | |
| D564,859 | S | 3/2008 | Brojanac et al. | |
| 8,402,798 | B2 * | 3/2013 | Brojanac | E05B 67/383 269/212 |
| 9,388,606 | B2 | 7/2016 | Garthe et al. | |
| D808,347 | S | 1/2018 | Benda et al. | |
| 10,267,066 | B2 | 4/2019 | Fan | |
| 2010/0244348 | A1 * | 9/2010 | Castor | B25B 5/101 269/165 |
| 2012/0047714 | A1 * | 3/2012 | Barillaro | B25B 5/142 29/559 |
| 2012/0193558 | A1 * | 8/2012 | Hoots | F16K 37/0041 251/89 |
| 2015/0361691 | A1 | 12/2015 | Garthe et al. | |
| 2018/0272499 | A1 * | 9/2018 | Cheng | B25B 1/2489 |
| 2019/0366515 | A1 * | 12/2019 | Engeron | B25B 5/02 |

FOREIGN PATENT DOCUMENTS

| | | |
|---|---|---|
| DE | 7538643 U | 4/1976 |
| DE | 102018117023 A1 | 1/2020 |
| KR | 101961275 B1 | 3/2019 |

OTHER PUBLICATIONS

Brady Part 51394, Small Universal Valve Lockout; Internet printout of May 28, 2019, https://www.bradyid.com/en-us/product/51394; pp. 1-2.

* cited by examiner

SECURING APPARATUS FOR SECURING A VALVE LEVER IN A SET POSITION

CROSS-REFERENCES TO RELATED APPLICATIONS

This patent application claims the benefit of priority to German Patent Application No. 102019114349.7 filed May 28, 2019, which is incorporated herein by reference in its entirety.

FIELD

The invention relates to a securing apparatus for securing a valve lever in generally any desired set position.

BACKGROUND

In systems in which a risk can result from an incorrect position of an actuation element, such as of a valve lever, it is important to ensure that a correctly set position of the actuation element is not adjusted by accident or in an unauthorized manner. This can apply to a special degree to valve levers by means of which a gas conveying quantity can be set, for example. After setting a suitable position of the valve lever, in particular after closing the valve lever, it is therefore expedient to secure the set position of the valve lever against an adjustment by means of a securing apparatus.

The securing can comprise the valve lever being blocked in the set position so that it cannot be adjusted without releasing the securing apparatus. In general, however, merely a reliable, in particular not easily removable, marking of the valve lever can also already represent a securing of the valve lever, with it in particular being unambiguously recognizable on the basis of said marking that a risk can result from an adjustment of the valve lever from the set position.

A securing apparatus that is directly fastened to the valve lever can be provided for the purpose of the securing of a valve lever in a set position. In this respect, the fastening is advantageously of such a kind that it cannot be easily released. For example, the knowledge or the possession of a secret code, e.g. the knowledge of a code or the possession of a key, may be necessary for the release of the securing apparatus.

If the securing apparatus is fastened to the valve lever, an adjustment of the valve lever can thereby already be blocked. This can, for example, be the case in that, on an attempt to adjust the valve lever, the securing apparatus fastened to the valve lever abuts a fixed-position object which the valve lever could otherwise be led past, i.e. if the securing apparatus were not fastened to it.

However, as a rule, it is expedient that the securing apparatus can not only be fastened to the movable valve lever, but can simultaneously also be anchored at a fixed-position object—for example, via a cable that then prevents the securing apparatus from being further remote from the respective anchorage point than a spacing defined by the length of the cable. It is generally also conceivable that the securing apparatus is supported at a fixed-position object or is directly fastened thereto. In this way, the movability of the securing apparatus can be restricted such that the valve lever to which the securing apparatus is fastened is thereby prevented from moving out of its set position.

In this respect, it is important in each case that the securing apparatus is particularly reliably fastened to the valve lever. For this purpose, the securing apparatus can advantageously be locked in the state fastened to the valve lever. In other words, the securing apparatus can be configured to be locked in the state fastened to the valve lever such that it cannot be released from the valve lever or can only be released by force.

However, such locking is only effective when the securing apparatus also provides a reliable hold at the valve lever. For this purpose, the securing apparatus can be specifically adapted to the shape of a respective valve lever in order to hold it thereat in as form-fitted a manner as possible, for instance, through a complementary design. However, the disadvantage of such a securing apparatus specifically designed for valve levers of a certain shape is naturally that it cannot be used for other valve levers so that different securing apparatus have to be provided for different valve levers.

SUMMARY

It is an object of the invention to provide a securing apparatus for securing a (respective) valve lever in a set position that is as universally usable as possible with a large number of different valve levers and in so doing provides a reliable hold in each case on the fastening of the securing apparatus to a respective valve lever.

The object is satisfied by a securing apparatus having the features of claim 1. Advantageous embodiments of this securing apparatus in accordance with the invention result from the dependent claims, the present description and the Figures.

The securing apparatus in accordance with the invention is configured to secure a valve lever in a set position and comprises a base body; a sliding piece; and a screw element, wherein the base body and the sliding piece each have a clamping surface. The two clamping surfaces are in this respect provided to clamp the valve lever between them. In other words, the securing apparatus cooperates with the valve lever via the clamping surfaces and can be fastened to the valve lever by the clamping of the valve lever between the clamping surfaces.

To be able to clamp something between the clamping surfaces, it is expedient to configure them as movable relative to one another. In particular for this purpose, the sliding piece is displaceably supported at the base body along a longitudinal axis. The sliding piece is thereby also displaceable relative to the base body.

In accordance with the invention, the screw element is furthermore rotatably supported at the base body and has a thread that is in engagement with a mating thread of the sliding piece so that a position of the sliding piece relative to the base body along the longitudinal axis is thereby—i.e. by this cooperation of the screw element with the base body (rotatable support), on the one hand, and with the sliding piece (threaded engagement), on the other hand,—restricted to a maximum spacing between the clamping surfaces that can be changed by a rotation of the screw element in order to clamp the valve lever between the clamping surfaces. The axis of rotation about which the screw element is rotatably supported is in this respect preferably in parallel with said longitudinal axis, in particular identical to the longitudinal axis. To be able to clamp the valve lever between them, the clamping surfaces are expediently arranged opposite one another and facing toward one another.

Due to the mutual engagement of the thread and the mating thread, the sliding piece can be fixed with respect to its position relative to the screw element along the longitudinal axis in dependence on a rotational position of the screw element, i.e. the sliding piece can indeed be displaced relative to the screw element along the longitudinal axis by a rotation of the screw element, but otherwise (if the screw element is not rotated) adopts a fixed position relative to the screw element. In contrast, the support of the screw element at the base body can be such that the screw element is generally displaceable relative to the base element along the longitudinal axis, with this displaceability, however, being restricted at least at one side so that the sliding piece (together with the screw element) cannot be displaced relative to the base body beyond a maximum spacing of the clamping surfaces. The clamping of a valve lever between the clamping surfaces can then simply take place by a rotation of the screw element, whereby the maximum spacing is reduced until it corresponds to the spacing of the clamping surfaces contacting the valve lever at both sides so that the clamping surfaces cannot be moved away from one another and from the valve lever.

The support of the screw element at the base body can also be such that the position of the screw element relative to the base body is not only restricted at one side, but also in an opposite direction with respect to the longitudinal axis. For example, the screw element can be rotatable relative to the base body, but can be fixed in an axial direction, for instance, by a screw head contacting the one side of the base body and by a circlip contacting the other side. Not only a maximum spacing (depending on the rotational position of the screw element) thereby results, but also a minimum spacing (possibly depending on the rotational position of the screw element) of the two clamping surfaces. The maximum spacing and minimum spacing can in particular also be identical so that the position of the sliding piece relative to the base body along the longitudinal axis is fixed in dependence on the respective rotational position of the screw element. In other words, the clamping surfaces can then not only be displaced toward one another by a rotation of the screw element, but can also be displaced away from one another by an opposite rotation.

Provision is furthermore made in accordance with the invention that, in dependence on a rotational position of the screw element, one of possibly a plurality of blocking receivers formed at the screw element is aligned with one of possibly a plurality of blocking receivers formed at the base body so that a blocking element can engage into both blocking receivers—i.e. into the two blocking receivers currently aligned with one another—and can in particular engage through both blocking receivers in order to block the screw element in the corresponding rotational position—i.e. in the rotational position in which the two blocking receivers are aligned. For, due to the fact that the blocking element simultaneously engages into both aligned blocking receivers, said blocking receivers can be prevented from rotating relative to one another.

The blocking element can in particular be a cable, preferably the cable of a cable protection or of a cable locking system, so that the cable can then simultaneously be used to anchor the securing apparatus (as described further above) to a fixed-position object, e.g. to a pipe in the vicinity of the valve lever. For example, a cable locking system as described in US 2015/0361691 A1 or in U.S. Pat. No. 9,388,606 B2 can be used for this purpose. In addition, the blocking element can generally also be the hoop of a padlock. It is then preferably a padlock having a flexible hoop as is, for example, described in U.S. Pat. No. 10,267,066 B2 or DE 10 2018 117 023.8 since such a flexible hoop can be used in a corresponding manner to a cable for an additional anchoring of the securing apparatus at a fixed-position object. Where reference is made in connection with the invention to a cable, this term generally covers a flexible elongate element, in particular a wire rope (whether jacketed by plastic or without a jacket), or said flexible hoop of a padlock.

The blocking receivers are advantageously configured to be engaged through by the respective blocking element—be it a cable or a hoop. The respective blocking element itself does not necessarily have to be part of the securing apparatus in this respect. Rather, the securing apparatus can be configured for use with a separate blocking element, for instance, with a known locking system or a known padlock.

Furthermore, it is preferred that when the securing apparatus clamps the valve lever between the clamping surfaces and a blocking receiver of the screw element is aligned with a blocking receiver of the base body, these blocking receivers at least substantially directly contact one another and cannot be spaced apart from one another in the direction of the longitudinal axis. In this way, a flexible blocking element such as a cable or a hoop, if it simultaneously engages into both blocking receivers, can also reliably prevent the two blocking receivers from being rotated against one another out of their aligned arrangement so that the screw element is blocked by the blocking element in its set rotational position.

It can generally be sufficient if the screw element and the base body each only have a single blocking receiver. The blocking receiver of the screw element and the blocking receiver of the base body can then be aligned with one another in rotational positions of the screw element relative to the base body that differ from one another by one or more complete rotations of the screw element in each case. The screw element can then be blocked in these rotational positions to which a different maximum spacing of the clamping surfaces respectively corresponds. The difference between the corresponding maximum spacings that can be defined in this way results from the pitch of the thread and of the mating thread. Due to small pitches, e.g. due to the use of a fine thread, the maximum spacing can be set very finely for a precise clamping of the valve lever.

In addition, the accuracy of the adaptation of the maximum spacing of the clamping surfaces to the dimensions of a respective valve lever can be increased by a larger number of blocking receivers. Even if a second blocking receiver, which is arranged diametrically opposite the first blocking receiver with respect to the axis of rotation, is only provided either at the base body or at the screw element, one of these two blocking receivers can be aligned with the blocking receiver of the respective other element after half a rotation in each case so that the maximum spacings that can be defined only differ by half the thread pitch. Due to a suitable selection of the number of blocking receivers and/or of the thread pitch, the differences between the maximum spacings that can be defined can be moved into the region of the clearance that is anyway present so that an at least approximately continuous setting is possible. In this way, the securing apparatus is particularly universally usable at different valve levers.

In accordance with an advantageous embodiment, the one clamping surface comprises a surface composed of a roughened metal, whereas the other clamping surface comprises an elastic mat, in particular an expandable and/or a compressible mat. The metal can, for example, be a tool steel, in particular a hardened tool steel, or a hard metal. The elastic mat can e.g. be configured as a silicone mat. The elastic mat preferably has a Shore A hardness in a range from 50° to 70°, preferably in a range from 55° to 65°, in particular of about 60°. Due to the different design of the two clamping surfaces, different properties of the two clamping surfaces, which each per se contribute to a reliable hold of the securing apparatus at the valve lever, can be advantageously combined to achieve a particularly reliable fastening of the securing apparatus to the valve lever.

The surface of the one clamping surface can in particular be roughened in that the metal is grooved. Parallel grooves of the grooving can e.g. have a spacing in a range from 2.2 mm to 3.0 mm, in particular from 2.5 mm to 2.7 mm. The depth of the grooves can, for instance, be in a range from 1.0 mm to 1.8 mm, preferably from 1.3 mm to 1.5 mm. For a good adaptability of the clamping surface to different geometries, the grooving can be square, for example. The structures formed between the grooves can in particular be at least substantially of pyramid shape.

The roughening in particular effects a reinforcement of the friction between the clamped valve lever and the clamping surface that advantageously counteracts a pulling off or slipping off of the securing apparatus from the valve lever in a direction transverse to the longitudinal axis. This effect can be particularly strong if the valve lever is provided with a coating or a cover, for example by dip painting, to improve the grip. Such a coating, which can e.g. comprise a resin, or a cover is typically comparatively thick and elastically compressible so that the roughened surface of the one clamping surface can press into the coating at different depths at different points when the securing apparatus is fixedly clamped to the valve lever and the securing apparatus can thereby be particularly reliably protected against a slipping.

The elastic mat provided at the other clamping surface can have an areal shape and/or a structured surface. The mat can in particular be nubbed at its surface with which it contacts a respective valve lever clamped between the clamping surfaces. In this respect, the nubs can be arranged distributed in a regular manner over the surface. Furthermore, the surface of the elastic mat can be concave, even with the exception of possibly provided nubs. For example, the surface can be inwardly arched so that it is thicker at two opposite margins of the surface than in an intermediate region in parallel therewith. The surface can in particular have the shape of a cylinder jacket section whose cylinder axis is oriented perpendicular to the longitudinal axis. If the clamping surface having the elastic mat has a rectangular outline having two longer and two shorter sides, the cylinder axis is preferably aligned in parallel with the two longer sides.

For the fastening of the mat to the base body or to the sliding piece, the mat can have one or more anchoring prolongations at a lower side opposite said surface, said anchoring prolongations being configured to be inserted into corresponding recesses that are formed in the base body or in the sliding piece and that can be formed by simple bores. The anchoring prolongations preferably extend in parallel with the longitudinal axis away from said lower side. For example, a respective anchoring prolongation can be provided in four corners of an at least substantially rectangular lower side of the mat. The lower side can, however, also have a different shape and the anchoring prolongations can also be placed differently. A single anchoring prolongation can generally also be sufficient.

The anchoring prolongations can advantageously be substantially rotationally symmetrical with respect to a symmetry axis oriented in the longitudinal direction. In this respect, the anchoring prolongations preferably have a conical section whose diameter decreases as the spacing from the lower side of the mat increases. The minimum diameter of the conical section is in this respect expediently smaller than the diameter of the corresponding receiver in the base body or in the sliding piece so that the anchoring prolongation can engage into the receiver in a simple manner. In the direction away from the lower side of the mat, the conical section can also be adjoined by an end section having a constant diameter that corresponds to the minimum diameter of the conical section and that facilitates a threading of the anchoring prolongation into the corresponding receiver.

The maximum diameter of the conical section, in contrast, is preferably larger than the diameter of the corresponding receiver. In this respect, it is furthermore preferred if a constriction is formed between the conical section and the lower side of the mat, with the diameter of said constriction again being reduced with respect to the maximum diameter of the conical section and in particular at least substantially corresponding to the diameter of the corresponding receiver. A margin of the receiver can thereby engage into the constriction and can thereby engage behind the conical section when the anchoring prolongation is completely inserted into the corresponding receiver. In this way, a reliable hold of the elastic mat at the base body or at the sliding piece is achieved.

The elasticity of the mat in this respect makes it possible to insert the conical section of the anchoring prolongation into the corresponding receiver in the base body or in the sliding piece even though the conical section at least partly has a larger diameter than this receiver. In order to further increase the local deformability of the elastic mat in the region of the conical section and thereby to enable the largest possible maximum diameter of the conical section for a particularly reliable hold of the mat at the base body or at the sliding piece, the anchoring prolongation is preferably at least partly hollow, in particular over at least one third of the longitudinal extent of the anchoring prolongation. The respective hollow space can be closed in this respect. However, the hollow space is preferably outwardly open and in particular extends up to an end face of the anchoring prolongation which faces away from the lower side of the mat and into which it opens.

The mat can in particular at least be elastic, in particular elastically extensible and/or compressible, in the direction of a surface normal onto the clamping surface. The mat preferably comprises silicone, but can also be composed of rubber or of another elastomer. Due to the elastic mat, the clamping surface thus has a layer at its surface that can at least be adapted to a certain degree to the outer shape of a respective valve lever. This makes it possible to reduce the maximum spacing between the clamping surfaces such that the valve lever can at least be partly pressed into the elastic mat. The resulting elastic deformation of the elastic mat in this respect not only ensures that the elastic mat is easily adapted to the shape of the valve lever, but simultaneously also provides an advantageous contact pressure that contributes to a reliable hold of the securing apparatus at the valve lever.

The roughened surface of the one clamping surface can generally also have a certain elasticity that is smaller than the elasticity of the elastic mat of the other clamping surface by one or more orders of magnitude, however.

Due to the combination of such differently designed clamping surfaces, advantageous effects for a reliable clamping of the valve lever can thus be achieved on different scales. If the valve lever is, as explained, provided with an elastic coating or an elastic cover, the one clamping surface (the surface composed of a roughened metal) proves to be particularly effective, whereas the other clamping surface (that is the surface having the elastic mat) ensures a reliable clamping of the valve lever in the case of a substantially inelastic valve lever (for instance, composed of metal without a coating or a cover). The described design of the two clamping surfaces thus contributes to a particularly universal usability of the securing apparatus at very different valve levers.

In accordance with a further advantageous embodiment, the base body has a rail which extends in the direction of the longitudinal axis and in which a guide section of the sliding piece is received and is displaceable in a guided manner. This displaceability is a general displaceability of the sliding piece relative to the base body that can, however, be restricted by the screw element or can even be canceled during the fastening of the securing apparatus to a valve lever. The guide section can, for example, be configured in the manner of a sliding block and can be displaceable in a guided manner in the rail. The axis of rotation about which the screw element is rotatably supported preferably extends through the rail. The screw element can in particular extend completely or at least up to a predominant part within the rail and is preferably aligned in parallel with the longitudinal axis in so doing.

The rail preferably has a C-shaped section in cross-section. The C-shaped section of the rail can engage around the guide section of the sliding piece at three or even four sides. The guide section of the sliding piece is preferably correspondingly formed complementary to the C-shaped section of the rail in the region of the rail, in particular with a T-shaped section. A C-shaped section advantageously prevents the guide section from leaving the rail transversely to the longitudinal axis. The C shape can in this respect be approximated by straight sections. A central section can, for example, be provided from whose two ends a respective marginal section in each case extends in the same direction perpendicular to the central section, with a respective end section adjoining the ends of this marginal section, and with the two end sections being aligned in parallel with the central section facing toward one another. It is then in particular ensured by the end sections that the guide section can only be displaced along the longitudinal axis within the rail, but cannot be removed from the rail transversely to the longitudinal axis, in particular not perpendicular to the central section. The marginal sections do not necessarily have to be in parallel with one another, but can, for example, also extend obliquely toward one another in the manner of a dovetail guide. The profile is preferably in mirror symmetry with respect to a plane in parallel with the longitudinal axis.

In accordance with an advantageous further development of an embodiment in which the base body has a rail and the sliding piece has a displaceable guide section that is received and displaceable in a guided manner therein, the width of the rail amounts to at least 80%, preferably to at least 90%, of the width of the clamping surface of the base body and/or the depth of the rail amounts to at least 30%, preferably to at least 50%, of the depth of the clamping surface of the base body. The width and the depth are in this respect each defined perpendicular to the longitudinal axis and to one another. The width can in particular correspond to the extent of a central section, for example of the central section mentioned above, of a section of the rail and/or to the maximum spacing of two opposite marginal sections of a section of the rail, for example of the two marginal sections mentioned above. Since the rail thus extends transversely to the longitudinal axis over a large part of the extent of the clamping surface of the basic body, in particular in at least one direction transverse to the longitudinal axis (namely in the direction of the width) over almost the total extent of the clamping surface of the base body, a particularly reliable displaceable support and guidance of the sliding piece at the base body can be achieved. In this way, the sliding piece is particularly less prone to a canting.

In accordance with a further advantageous embodiment, the clamping surfaces are aligned in parallel with one another. In this way, it is avoided that a valve lever clamped between the clamping surfaces is pressed laterally out of the clamping surfaces by the clamping surfaces themselves.

In this respect, the clamping surfaces are preferably oriented perpendicular to the longitudinal axis. This has the advantage that the clamping surfaces act on the valve lever substantially perpendicular to the clamping surfaces when the valve lever is clamped between the clamping surfaces. Resulting forces can thereby be reliably discharged without forces acting on the clamping surfaces themselves transversely to the longitudinal axis.

In accordance with a further advantageous embodiment, the screw element is configured in the manner of a wing screw or in the manner of a wing nut. If the screw element is configured as a wing screw, the thread of the screw element is preferably configured as an external thread at its screw shaft. Said mating thread of the sliding piece can then be configured as an internal thread at a bore of the sliding piece into which the screw shaft of the wing screw is screwed. If the screw element is, in contrast, configured as a wing nut, the thread of the screw element is preferably configured as an internal thread at a bore extending through the wing nut. The sliding piece can then have a screw shaft that extends in the longitudinal direction and that has said mating thread as the external thread. In both cases, the screw shaft can engage through a respective bore of the base body.

For example, the screw element can have a screw head that has an elongate shape whose longitudinal extent is oriented perpendicular, in particular at least substantially radially, to the axis of rotation about which the screw element is rotatable. If the screw element is a wing nut, the screw head can at least substantially correspond to the total screw element. If the screw element is a wing screw, the screw element can also have a screw shaft in addition to the screw head. The elongate shape enables a good grip and force transmission on the rotation of the screw element due to the lever effect when radial end sections of the shape are acted on.

In accordance with an advantageous further development of the securing apparatus in accordance with the invention, the screw element has a screw head having at least one application surface that is aligned in parallel with the axis of rotation about which the screw element is rotatable and that is configured to be acted on by hand in a peripheral direction about the axis of rotation in order to rotate the screw element. A perpendicular action on the application surface can in this respect in particular take place at least substantially tangentially to the axis of rotation.

It is particularly advantageous in this respect if the application surface has an engagement depression in a radial end section spaced apart from said axis of rotation in order to prevent a radial slipping off of a finger of the user from the application surface, said finger acting on the application surface in said end section in the peripheral direction and in so doing in particular engaging into the engagement depression.

The engagement depression can in particular correspond to a concavely shaped section of the application surface. For example, to form the engagement depression in the radial end section, the application surface can be concavely arched about an axis that is in parallel with the axis of rotation and that is spaced apart from the axis of rotation. The radius of curvature of this curvature preferably amounts to at least 0.5 cm in this respect.

In accordance with an embodiment, the application surface can be oriented radially to the axis of rotation in the region of the axis of rotation of the screw element, with the engagement depression in the radial end section being arched, starting from the radial orientation, in the direction of a tangential orientation. The engagement depression does not have to be completely tangentially oriented in this respect; however, such an arch or curvature can already form an abutment that sufficiently reliably prevents the explained slipping off of a finger during the rotational movement.

The engagement depression preferably has one or more points at which the surface normal is at least substantially oriented in the peripheral direction and one or more points at which the surface normal also has sections radially inwardly, with the resulting deviation from an orientation in the peripheral direction, for example, amounting to at least 20°, preferably to at least 30°, in particular to at least 45°. The transition of the orientation of the surface normals therebetween is preferably continuous so that it does not have a kink. The engagement depression advantageously has a size that enables an engagement with a fingertip. A diameter, e.g. a mean diameter or a minimum diameter, of the engagement depression can, for example, amount to at least 1 cm. The above-mentioned transition can, for example, extend over a distance of at least 0.5 cm.

Due to such an engagement depression, the screw element can be rotated particularly securely and quickly. This is important since in a securing apparatus of the kind spoken of here, the finger of the user should not slip off and hereby, for instance, accidentally actuate the valve lever to be secured (or a valve lever arranged in the environment) and since relatively large adaptations of the spacing between the clamping surfaces are necessary at times in view of different possible thicknesses of valve levers to be secured.

The provision of an engagement depression in the radial end section of the application surface thus simplifies the rotation of the screw element since the fingertip of a finger aligned in parallel with the axis of rotation, e.g. of an index finger, can act on the application surface in the region of the engagement depression in the rotation direction and can then be moved about the axis of rotation a multiple of times for a fast rotation of the screw element. In this respect, the radius of the circular path of the fingertip can naturally vary and therefore also threatens to accidentally become so large that the finger slips off from the application surface radially outwardly. This risk can be reduced by the engagement depression into which the fingertip can engage since the engagement depression, due to its concave shape, can oppose a radially outward slipping off with an at least partly radially inwardly facing part region. The screw element can thus be manually driven in a particularly reliable manner to make a large number of fast rotations.

In accordance with an advantageous further development, the blocking receiver of the screw element and said engagement depression are arranged diametrically opposite one another with respect to said axis of rotation. If the screw head has an elongate shape, the blocking receiver and the engagement depression can in particular be arranged at diametrically mutually opposite ends of the longitudinal extent of this elongate shape. Due to the diametrical arrangement, the lever effect can be utilized in two ways with respect to the axis of rotation: on the one hand, for a manual rotation of the screw element by an action on the radial end section of the application surface that has the engagement depression and, on the other hand, for a reliable blocking of the screw element in a rotational position in which the blocking receiver is aligned with a blocking receiver of the base body and in which these two blocking receivers are jointly engaged through by a blocking element.

In accordance with a further advantageous further development, the screw head has two application surfaces of said kind that are therefore each aligned in parallel with the axis of rotation, that are configured to be acted on by hand in a peripheral direction in order to rotate the screw element, and that each have an engagement depression in a radial end section spaced apart from the axis of rotation in order to prevent a radial slipping off of a finger from the respective application surface, said finger acting on the respective application surface in the respective end section in the peripheral direction. In this respect, the two application surfaces are preferably oriented facing in opposite directions. They can thereby be acted on from opposite sides so that, depending on the desired direction of rotation, the one or the other application surface can be acted on and the screw head can be fixedly gripped at both sides, e.g. by a thumb and an index finger, for a strong rotation of the screw element in order to achieve a high torque for the clamping of the valve lever between the clamping surfaces.

In this respect, it is furthermore preferred if the two application surfaces are in mirror symmetry with respect to one another. The application surfaces can in particular be symmetrical with respect to a mirror plane including said axis of rotation. In general, however, a mirror symmetry can, for instance, also be present with respect to the axis of rotation.

If two application surfaces are provided, they can in accordance with a further advantageous further development form side surfaces of a web that is formed between the application surfaces and that extends at least substantially radially to the axis of rotation, in particular corresponding to a longitudinal extent of the screw head. Such a web can be easily gripped at both sides and can thus act as a grip for a rotation of the screw element. It is preferred in this respect that a radial end section of the web that is formed between said radial end sections of the application surfaces is widened at both sides in the peripheral direction about the axis of rotation. In this respect, this widening can in particular result from the depression shape or from the concave curvature of the end sections of the application surfaces. Furthermore, the web can in particular be widened such that it at least substantially has a Y shape or a T shape from a direction of view in parallel with the axis of rotation. The widening then corresponds to the moving apart of the two upper limbs of the Y shape or of the T shape. The Y shape or T shape can in this respect merely approximate an exact shape of the letter Y or the letter T. The web can in particular have curved transitions instead of corners.

In accordance with an embodiment, the screw element can have an elongate outline in a normal plane to the axis of rotation, wherein the web extends at its end remote from the widened end section up to the blocking receiver of the screw element; and wherein the width of the elongate outline at least substantially corresponds to the width of the widened end section of the web. A shape of the screw element is hereby formed that, on the one hand, due to a large radial extent in a longitudinal direction—as explained—enables the application of a high torque for the rotation of the screw element and thus for the clamping of the valve lever between the clamping surfaces and also enables a reliable blocking of the screw element by means of the blocking element and, on the other hand, has a minimal extent in a transverse direction in order not to form an obstacle for the installation environment of the securing apparatus in the blocked rotational position of the screw element and in particular does not laterally project over the base body.

In accordance with a further advantageous embodiment, the screw element has a screw shaft, at which the thread is formed, and a screw head that is widened with respect to the screw shaft and that can be directly adjacent to the screw shaft at an end of the screw shaft. It can in particular be the screw head already mentioned. The screw head is in this respect in particular widened transversely to the longitudinal extent of the screw shaft that is aligned in parallel with said longitudinal axis and that is widened with respect to the screw shaft, for example, in that it has a larger diameter. If the screw element is configured as a wing screw, the screw head can have an elongate shape whose longitudinal extent is aligned transversely to the longitudinal axis.

Furthermore, the base body has a bore that extends in the direction of the longitudinal axis and that is engaged through by the screw shaft of the screw element, wherein the screw head is arranged at one side of the bore, whereas the thread of the screw shaft is in engagement with the mating thread of the sliding piece at the other, opposite side of the bore. In this respect, the screw head is widened with respect to the screw shaft such that it does not fit through the bore. Therefore, the clamping surface of the sliding piece that is coupled to the screw element via the threaded engagement can only be moved so far away from the clamping surface of the base element until the screw head at the one side of the bore contacts the bore. The displaceability of the sliding piece relative to the base body is thereby restricted by means of the screw element to a maximum spacing between the clamping surfaces that depends on the rotational position of the screw element via the mutual engagement of the thread and the mating thread.

The one or possibly more blocking receivers of the screw element can in particular be formed at the screw head.

In accordance with an advantageous further development of the above embodiment, a securing clamp is provided that at least partly engages around the screw shaft at said other side of the bore—i.e. at that side of the bore at which the thread of the screw shaft is in engagement with the mating thread of the sliding piece—and that is axially fixed to the screw shaft with respect to the longitudinal axis. The securing clamp can, for example, engage around the screw shaft over more than a semicircle, preferably over at least a three-quarter circle, but less than a full circle. Furthermore, the securing clamp can at least be elastic such that it can be plugged onto the screw shaft transversely to the longitudinal axis or can be removed from said screw shaft. However, such an elasticity does not necessarily have to be provided since the securing clamp can also be axially pushed onto the screw shaft along the longitudinal axis. The securing clamp can be a circlip, for example.

Such a securing clamp can in particular serve to avoid a release of the screw element from the base body even if the thread of the screw element and the mating thread of the sliding piece have been released from one another or have not yet been brought into engagement with one another. In addition, the securing clamp can serve to initially hold the clamping surfaces at a spacing before the fixed clamping of the securing apparatus to the valve lever in order to be able to position the securing apparatus more easily at the valve lever before the clamping surfaces are subsequently moved toward one another by a rotation of the screw element and act on the valve lever in a clamping manner at both sides.

The invention will be further explained only by way of example with reference to the Figures in the following.

DETAILED DESCRIPTION

A possible embodiment of a securing apparatus 11 in accordance with the invention is shown in an exemplary manner in the Figures. The securing apparatus 11 comprises a base body 13; a sliding piece 15; and a screw element 17 that are connected to one another in a functional manner in FIGS. 1 to 4 and that are shown separately from one another in FIG. 5.

Figure 4:
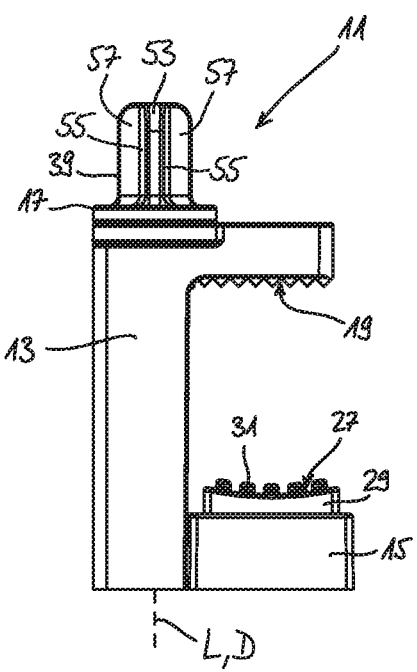

As can in particular be recognized in the side view of FIG. 4, the base body 13 is substantially L-shaped. One of the limbs of the L shape has a clamping surface 19 that has a rectangular shape and that comprises a surface composed of a square grooved metal (cf. in particular FIG. 2). The other limb of the L shape, which has a C-shaped section in cross-section as can in particular be recognized in FIG. 5, extends perpendicular to this clamping surface 19 along a longitudinal axis L. The C shape is in this respect formed by five sections that follow one another at a perpendicular angle to one another in each case, that are at least substantially straight, and whose central section is the longest and whose end sections are the shortest. Due to this section, a rail 21 is formed into which a guide section 23 of the sliding piece 15 designed complementary to the section is received and is displaceable in a guided manner in parallel with the longitudinal axis L. The guide section 23 of the sliding piece 15 has a T-shaped section in the region of the rail 21, wherein said five sections of the C-shaped section of the rail 21 engage around the guide section 23 of the sliding piece 15 at four sides (at all four sides and thus at five sections of the horizontal "T" beam).

Figure 5:
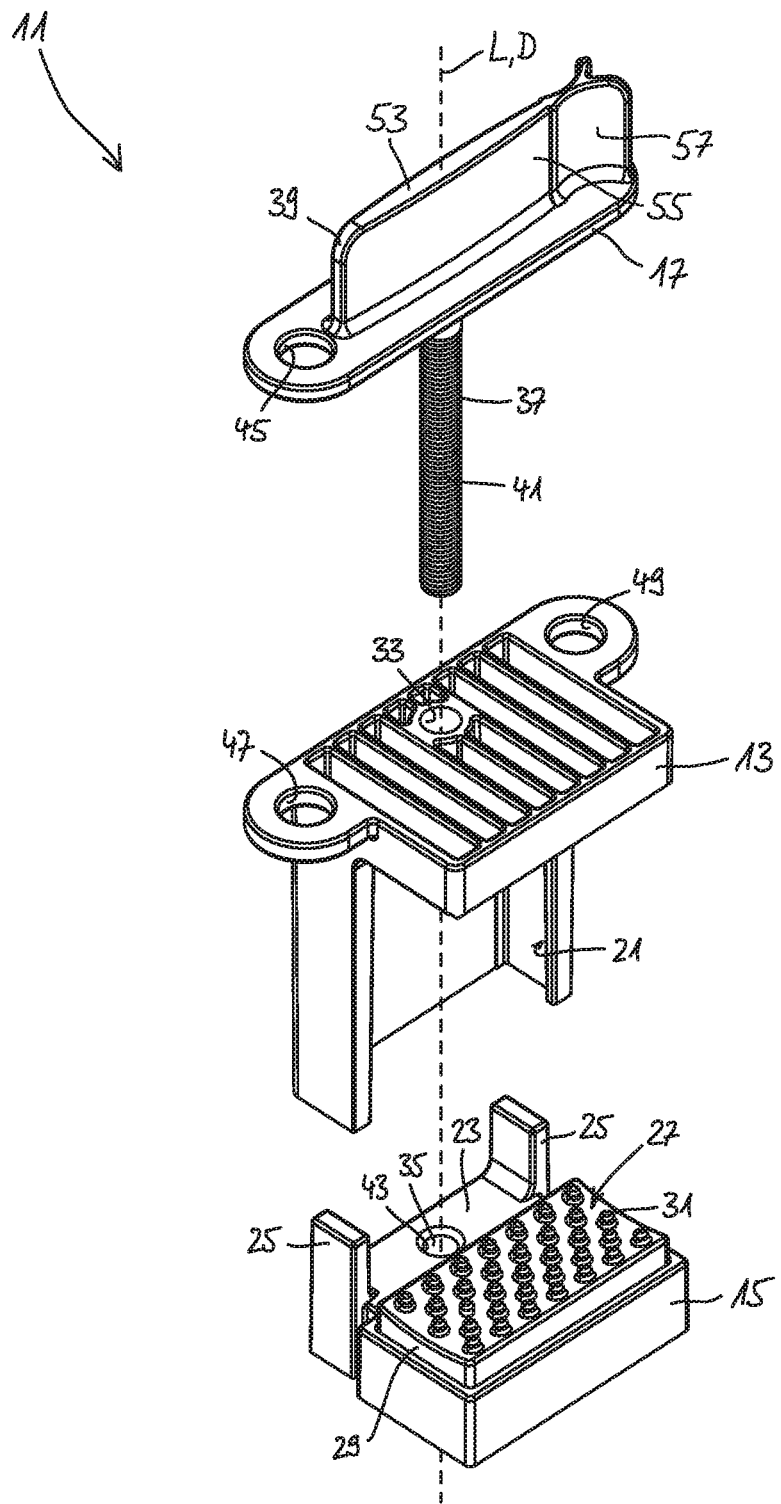
FIG. 5 shows the same embodiment in a perspective representation corresponding to FIG. 1, with the main elements of the securing apparatus, however, being shown separately from one another in the manner of an exploded representation.

As can in particular be recognized in FIG. 5, the sliding piece 15 is largely areal. However, the guide section 23 has two guide projections 25 that are arranged diametrically opposite one another with respect to the longitudinal axis L, that have an at least substantially rectangular cross-section, and that project in the same direction, namely in the direction of the clamping surface 19, in parallel with the longitudinal axis L from the remainder of the sliding piece 15. When the guide section 23 of the sliding piece 15 is received in the rail 21 of the base body 13, the guide projections 25 contact a respective at least substantially straight section of the rail 21 at three of their sides so that the guide projections 25 are surrounded by the rail 21 at three sides in each case. A canting of the sliding piece 15 in the rail 21 is thereby avoided and a reliable alignment of the sliding piece 15 relative to the base body is ensured.

The sliding piece 15 has a clamping surface 27 that is aligned in parallel with the clamping surface 19 of the base body 13 and thus, like it, is oriented perpendicular to the longitudinal axis L. The clamping surface 27 of the sliding piece 15 has a rectangular shape that substantially corresponds to the rectangular shape of the clamping surface 19 of the base body 13. An elastic mat, in particular a silicone mat 29, is provided at the clamping surface 27 of the sliding piece 15 and has a regular arrangement of nubs 31 that project from the otherwise planar surface of the silicone mat 29. The surface of the silicone mat 29 at which the nubs 31 are provided is concavely arched and thereby has the shape of a cylinder jacket section. The cylinder axis of this shape is in this respect aligned in parallel with the two longer sides of the rectangular shape of the clamping surface 27.

At a lower side opposite the surface having the nubs 31, the silicone mat 29 has four anchoring prolongations 32 that extend away from the lower side in parallel with the longitudinal axis L. The anchoring prolongations 32 engage through receivers formed in the sliding piece 15 such that they project from the receivers at the side of the sliding piece 15 opposite the clamping surface 27 (cf. FIG. 2). The anchoring prolongations 32 are substantially configured as cylindrical pins that, however, have a conical section in a middle axial region of their longitudinal extent, in which conical section the diameter of the respective anchoring prolongation 32 increases in the direction toward the lower side, starting from the diameter which the anchoring prolongation 32 has in an end section adjoining the conical section in the direction away from the lower side of the silicone mat 29.

Figure 1:
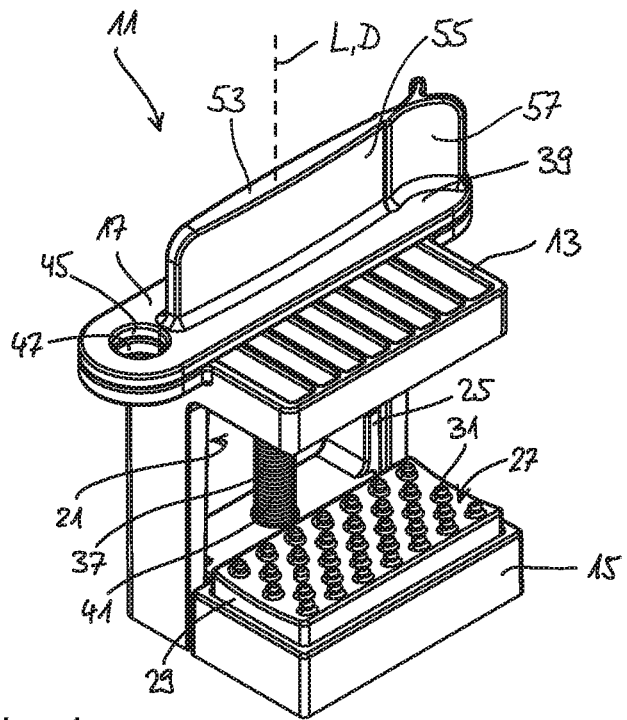
FIGS. 1 and 2 show an embodiment of a securing apparatus in accordance with the invention in a schematic perspective representation from two different angles of view.
Figure 2:
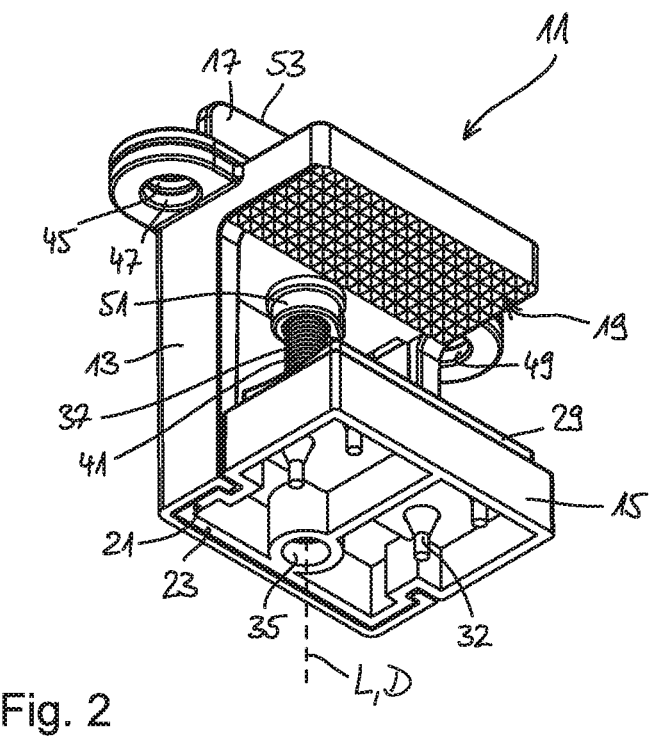

In the direction toward the lower side of the silicone mat 29, the conical section is additionally adjoined by an intermediate section having a constant diameter that is smaller than the maximum diameter of the conical section. A constriction is thereby formed between the lower side and the conical section, wherein the diameter of the respective anchoring prolongation 32 decreases abruptly at the transition between the conical section and the constriction from the maximum diameter of the conical section to the smaller diameter of the constriction. The diameter of the constriction is in this respect in the range between the maximum diameter and the minimum diameter of the conical section and substantially corresponds to the diameter of the receiver in which the respective anchoring prolongation 32 is inserted. In this way, the conical section is engaged behind by the margin of the receiver when the respective anchoring prolongation 32, as shown in FIG. 2, is completely inserted into the respective receiver so that the silicone mat 29 is thereby reliably anchored at the sliding piece 15.

The anchoring prolongation 32 is at least partly hollow so that the conical section of the anchoring prolongation 32 can be easily elastically compressed for the insertion through the corresponding receiver of the sliding piece 15. In this respect, a hollow space extends, starting from an end face of the respective anchoring prolongation 32 facing away from the lower side of the silicone mat 29, over at least one third of the longitudinal extent of the anchoring prolongation 32 into the latter and in so doing preferably extends over a predominant part of the conical section, in particular up to its maximum diameter.

The surface normals of the two clamping surfaces 19 and 27 are aligned facing toward one another and are in this respect arranged substantially congruently with regard to the longitudinal axis L with respect to their respective rectangular shape. The securing apparatus 11 can thereby be arranged at an actuation element, such as in particular a valve lever (not shown), such that the clamping surfaces 19 and 27 flank the actuation element at both sides. Due to the displacement of the sliding piece 15, whose guide section 23 is guided in the rail 21 of the base body 13, relative to the base body 13, the spacing between the clamping surfaces 19 and 27 can be changed until the clamping surfaces 19 and 27 contact the actuation element at both sides.

The base body 13 and the sliding piece 15 each have a bore 33 and 35 respectively that both extend along the longitudinal axis L and are thereby aligned with one another. The longitudinal axis L extends through the rail 21 in so doing.

The screw element 17 is configured as a wing screw and comprises a screw shaft 37 as well as a screw head 39 that is widened with respect to the screw shaft 37 and that is elongate in the form of a wing. The screw shaft 37 has a thread 41 configured as an external thread and extends through the bore 33 of the base body 13 and at least into the bore 35 of the sliding piece 15. Due to this arrangement, the screw element 17 is rotatably supported at the base body 13 about an axis of rotation D that is identical to the longitudinal axis L.

The bore 35 of the sliding piece 15 has a mating thread 43 configured as an internal thread (cf. FIG. 5; not shown separately) with which the thread 41 of the screw shaft 37 of the screw element 17 is in engagement. Due to this engagement, the position of the sliding piece 15 relative to the screw head 39 along the longitudinal axis L is fixed, but can be changed by a rotation of the screw element 17. Since the screw element 17 engages through the bore 33 of the base body 13, with the screw head 39 being arranged at the one side of the bore 33 and the threaded engagement between the screw shaft 37 and the sliding piece 15 taking place at the other side of the bore 33, the clamping surface 27 of the sliding piece 15 cannot be moved further away from the clamping surface 19 of the base body 13 than until the screw head 39 contacts the bore 33.

The spacing between the clamping surfaces 19 and 27 is thereby restricted to a maximum spacing that is dependent on the spacing of the sliding piece 15 relative to the screw head 39 and thus on the rotational position of the screw element 17. Therefore, due to a rotation of the screw element 17, this maximum spacing can be reduced to that spacing at which the two clamping surfaces 19 and 27 contact the valve lever to be secured from opposite directions, with a present clearance and elasticities of the clamping surfaces 19 and 27, in particular of the silicone mat 29 having the nobs 31, preferably also largely being used up so to speak. Since the spacing of the clamping surfaces 19 and 27 cannot be increased beyond the maximum spacing, the valve lever is then clamped between the clamping surfaces 19 and 27. The described design of the clamping surfaces 19 and 27 in this respect also in each case provides a particularly reliable hold even with valve levers of very different kinds.

Due to an opposite rotation of the screw element 17, the maximum spacing can be increased again and the securing apparatus 11 can thus be released from the respective valve lever again. To prevent an accidental release of the securing apparatus 11 or a release of the securing apparatus 11 by an unauthorized person, the screw head 39 has a blocking receiver 45 at one end of its longitudinal extent transverse to the longitudinal axis L in the form of an eyelet extending in parallel with the longitudinal axis L through a flange surface of the screw head 39. At the transition between the limbs of its L shape, the base body 13 has two lug-like flange surfaces which project perpendicular to both limbs of the L shape in mutually opposite directions and in which a respective blocking receiver 47 and 49 is likewise formed in the form of an eyelet extending in parallel with the longitudinal axis L through the respective flange surface.

In the rotational position of the screw element 17 shown in the Figures and in rotational positions that differ therefrom by complete rotations of the screw element 17 about the longitudinal axis L, the blocking receiver 45 of the screw element 17 is aligned with the one blocking receiver 47 of the base body 13. In rotational positions disposed therebetween that differ from said rotational positions by half a rotation of the screw element 17, the blocking receiver 45 is, in contrast, aligned with the other blocking receiver 49 of the base body 13.

When the blocking receiver 45 of the screw element 17 is aligned with one of the blocking receivers 47 and 49 of the base body 13, a cable, in particular of a cable locking system, or the, preferably flexible, hoop of a padlock can engage through the respectively aligned blocking receivers 45 and 47 or 45 and 49 and can thereby block the screw element 17 in the respective rotational position relative to the base body 13. In this way, the securing apparatus 11 can be locked at a set maximum spacing between the clamping surfaces 19 and 27 so that the securing apparatus 11 is secured against a release from the valve lever.

Figure 3:
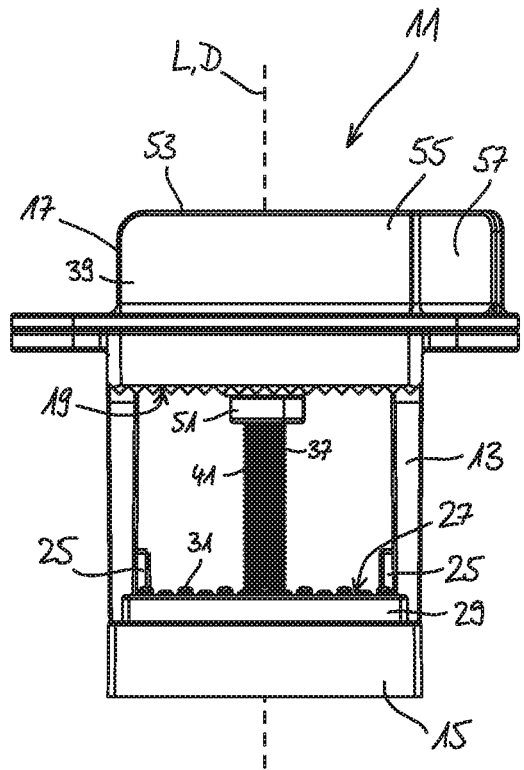
FIGS. 3 and 4 show the same embodiment in a schematic representation from the front or from the side.

In FIGS. 2 and 3, a securing clamp 51 of the securing apparatus 11 can furthermore be recognized that partly engages around the screw shaft 37 at the side of the bore 33 opposite the screw head 39. In this respect, the securing clamp is pierced at its side facing to the right in FIG. 3 so that it can be plugged onto the screw shaft 37 or removed from the screw shaft 37 transversely to the longitudinal axis L. The securing clamp 51 is axially fixed, at least with friction locking, preferably in a form-fitted manner, to the screw shaft 37.

The securing clamp 51 serves to prevent the clamping surface 27 of the sliding piece 15 from moving toward the clamping surface 19 of the base body 13 in an uncontrolled manner as long as the screw element 17 is not rotated. In this respect, the securing clamp 51 restricts the spacing between the clamping surfaces 19 and 27 to a minimum spacing. In this way, the securing apparatus 11 is kept open in a simple manner before it is fixedly clamped to a respective valve lever. In addition, the screw element 17 is secured to the base body 13 by the securing clamp 51 even if the screw element 17 has released from the sliding piece 15 due to an unscrewing rotation. The screw element 17 thereby cannot be lost.

The screw head 39 has a web 53 that is configured to be gripped by hand to rotate the screw element 17. The web extends along the longitudinal extent of the screw head 39 from the blocking receiver 45 up to the opposite radial end of the longitudinal extent. In this respect, the web 53 has two application surfaces 55 as side surfaces that are aligned in parallel with the axis of rotation D and that face in opposite directions perpendicular to the axis of rotation D and to the longitudinal extent of the screw head 39. The application surfaces 55 are in this respect in mirror symmetry with respect to a mirror plane that is spanned by the axis of rotation D and the longitudinal extent of the screw head 39.

From a direction of view in parallel with the axis of rotation D, the web 53 has a Y shape, with the upper limbs of the Y shape that run apart being arranged in a radial end section of the web 53 that is diametrically opposite the blocking receiver 45. The running apart of the limbs of the Y shape corresponds to a widening of the web 53 in this radial end section that results on the basis of engagement depressions 57 that are each formed in a radial end section of a respective one of the two application surfaces 55 corresponding to the radial end section of the web 53. These engagement depressions 57 are each formed in that the respective application surface 55 is concavely curved in its radial end section about an axis that is in parallel with the axis of rotation D and that is spaced apart from the axis of rotation D. In the region of the respective engagement depression 57, the application surfaces 55 are thereby curved or arched more, the further radially outward they are such that the respective surface normal has a continuously increasing portion radially inwardly. The engagement depressions 57 thus form a respective tangential elevated portion or an abutment relative to a purely radial orientation of the web 53 or of the application surfaces 55. In this way, a finger of the user engaging into the respective engagement depression 57 can be at least partly radially outwardly supported at the engagement depression 57 and thus slips off from the respective application surface 55 less easily radially outwardly.

Depending on the desired direction in which the screw element 17 is to be rotated, the fingertip of a finger aligned in parallel with the axis of rotation D can act on one of the two application surfaces 55 in its radial end section in the peripheral direction and in so doing engages into the engagement depression 57 formed there. To carry out a plurality of fast rotations of the screw element 17 in continuous succession, the finger can then be moved about the axis of rotation D on a circular path. Due to the engagement into the engagement depression 57, the risk of the finger slipping off from the application surface 55 radially outwardly is reduced since the engagement depression 57, due to its concave design, at least proportionally also comprises radially inwardly facing regions that oppose a radially outward slipping off. Thus, in a simple manner, the screw element 17 can be rotated fast particularly reliably a multiple of times.

REFERENCE NUMERALS 11 securing apparatus
13 base body
15 sliding piece
17 screw element
19 clamping surface
21 rail
23 guide section
25 guide projection
27 clamping surface
29 silicone mat
31 nub
32 anchoring prolongation
33 bore
35 bore
37 screw shaft
39 screw head
41 thread
43 mating thread
45 blocking recess
47 blocking recess
49 blocking recess
51 securing clamp
53 web
55 application surface
57 engagement depression
D axis of rotation
L longitudinal axis

What is claimed is:

1. A securing apparatus (11) for securing a valve lever in a set position, comprising a base body (13); a sliding piece (15); and a screw element (17),
wherein the base body (13) and the sliding piece (15) each have a clamping surface (19, 27);
wherein the sliding piece (15) is displaceably supported at the base body (13) along a longitudinal axis (L);
wherein the screw element (17) is rotatably supported at the base body (13) and has a thread (41) that is in engagement with a mating thread (43) of the sliding piece (15) so that a position of the sliding piece (15) relative to the base body (13) along the longitudinal axis (L) is restricted to a maximum spacing between the clamping surfaces (19, 27) that can be changed by a rotation of the screw element (17) in order to clamp the valve lever between the clamping surfaces (19, 27);
wherein, depending on a rotational position of the screw element (17), one of at least one blocking receiver (45) formed at the screw element (17) is aligned with one of at least one blocking receiver (47, 49) formed at the base body (13) so that a blocking element can engage into both the at least one blocking receiver (45) of the screw element (17) and the at least one blocking receiver (47, 49) of the base body (13) in order to block the screw element (17) in the corresponding rotational position;
wherein the base body (13) has a rail (21) which extends in the direction of the longitudinal axis (L) and in which a guide section (23) of the sliding piece (15) is received and is displaceable in a guided manner; and
wherein an axis of rotation (D) about which the screw element (17) is rotatably supported extends through the rail;
wherein the rail includes elongated portions on diametrically opposite sides of the axis of rotation;
wherein the guide section of the sliding piece has protrusions that are received in recesses formed in the rail;
wherein an outer facing surface of at least one of the protrusions is guided along and contacts an inner facing surface of the recess in which the respective protrusion is received, wherein the outer facing surface faces away from the axis of rotation;
wherein the entire outer facing surface of the at least one protrusion is guided along and contacts the inner facing surface of the recess in which the respective protrusion is received.

2. A securing apparatus in accordance with claim 1, wherein one of the clamping surfaces (19) of the base body (13) and the sliding piece (15) comprises a surface composed of a roughened metal and the other of the clamping surfaces (27) of the base body (13) and the sliding piece (15) comprises an elastic mat (29).

3. A securing apparatus in accordance with claim 2, wherein the surface composed of a roughened metal comprises a grooved metal.

4. A securing apparatus in accordance with claim 1, wherein the width of the rail (21) amounts to at least 80% of the width of the clamping surface (19) of the base body (13); and/or wherein the depth of the rail (21) amounts to at least 30% of the depth of the clamping surface (19) of the base body (13).

5. A securing apparatus in accordance with claim 4, wherein the width of the rail (21) amounts to at least 90% of the width of the clamping surface (19) of the base body (13); and/or wherein the depth of the rail (21) amounts to at least 50% of the depth of the clamping surface (19) of the base body (13).

6. A securing apparatus in accordance with claim 1, wherein the clamping surfaces (19, 27) are aligned in parallel with one another.

7. A securing apparatus in accordance with claim 6, wherein the clamping surfaces (19, 27) are oriented perpendicular to the longitudinal axis (L).

8. A securing apparatus in accordance with claim 1, wherein the screw element (17) is configured as a wing screw or as a wing nut.

9. A securing apparatus in accordance with claim 1,
wherein the screw element (17) has a screw head (39) comprising at least one application surface (55) that is aligned in parallel with the axis of rotation (D) about which the screw element (17) is rotatable and that is configured to be acted on by hand in a peripheral direction about the axis of rotation (D) in order to rotate the screw element (17);
and wherein the application surface (55) has an engagement depression (57) in a radial end section spaced apart from the axis of rotation (D) in order to prevent a radial slipping off of a finger from the application surface (55), said finger acting on the application surface (55) in said end section in the peripheral direction.

10. A securing apparatus in accordance with claim 9, wherein, to form the engagement depression (57) in the radial end section, the application surface (55) is concavely arched about an axis that is in parallel with the axis of rotation (D) and that is spaced apart from the axis of rotation (D).

11. A securing apparatus in accordance with claim 9, wherein the application surface (55) is oriented radially to the axis of rotation (D) in the region of the axis of rotation (D), with the engagement depression (57) in the radial end section being arched, starting from the radial orientation, in the direction of a tangential orientation.

12. A securing apparatus in accordance with claim 9, wherein the blocking recess (45) of the screw element (17) and the engagement depression (57) are arranged diametrically opposite one another with respect to the axis of rotation (D).

13. A securing apparatus in accordance with claim 9, wherein the screw head (39) has a further application surface (55) that is aligned in parallel with the axis of rotation (D) and that is configured to be acted on by hand in the peripheral direction about the axis of rotation (D); wherein the at least one application surface (55) and the further application surface (55) face in mutually opposite directions; and wherein the further application surface (55) also has an engagement depression (57) in a radial end section spaced apart from the axis of rotation (D).

14. A securing apparatus in accordance with claim 13,
wherein the application surfaces (55) form side surfaces of a web (53) that is formed between the application surfaces (55) and that extends at least radially to the axis of rotation (D); and
wherein a radial end section of the web (53) that is formed between said radial end sections of the application surfaces (55) is widened at both sides in the peripheral direction about the axis of rotation (D).

15. A securing apparatus in accordance with claim 14, wherein the radial end section of the web (53) is widened such that the web (53) has a Y shape or a T shape from a direction of view in parallel with the axis of rotation (D).

16. A securing apparatus in accordance with claim 14, wherein the screw element (17) has an elongate outline in a normal plane to the axis of rotation (D); wherein the web (53) extends at an end remote from the widened end section up to the at least one blocking receiver (45) of the screw element (17); and wherein the width of the elongate outline corresponds at least to the width of the widened end section of the web (53).

17. A securing apparatus in accordance with claim 1, wherein the screw element (17) has a screw shaft (37), at which the thread (41) is formed, and a screw head (39) that is widened with respect to the screw shaft (37);
wherein the base body (13) has a bore (33) that extends in the direction of the longitudinal axis (L) and that is engaged through by the screw shaft (37) of the screw element (17); and
wherein the screw head (39) is arranged at one side of the bore (33), whereas the thread (41) of the screw shaft (37) is in engagement with the mating thread (43) of the sliding piece (15) at the other side of the bore (33).

18. A securing apparatus in accordance with claim 17, further comprising a securing clamp (51) that at least partly engages around the screw shaft (37) at said other side of the bore (33) and that is axially fixed to the screw shaft (37) with respect to the longitudinal axis (L).

19. The securing apparatus of claim 1, wherein the outer facing surface and the inner facing surface each have three sides, wherein the sides of the outer facing surface are guided along and contact the corresponding sides of the inner facing surface within the recess of the rail.

20. A securing apparatus (11) for securing a valve lever in a set position, comprising a base body (13); a sliding piece (15); and a screw element (17),
wherein the base body (13) and the sliding piece (15) each have a clamping surface (19, 27);
wherein the sliding piece (15) is displaceably supported at the base body (13) along a longitudinal axis (L);
wherein the screw element (17) is rotatably supported at the base body (13) and has a thread (41) that is in engagement with a mating thread (43) of the sliding piece (15) so that a position of the sliding piece (15) relative to the base body (13) along the longitudinal axis (L) is restricted to a maximum spacing between the clamping surfaces (19, 27) that can be changed by a rotation of the screw element (17) in order to clamp the valve lever between the clamping surfaces (19, 27);
wherein, depending on a rotational position of the screw element (17), one of at least one blocking receiver (45) formed at the screw element (17) is aligned with one of at least one blocking receiver (47, 49) formed at the base body (13) so that a blocking element can engage into both the at least one blocking receiver (45) of the screw element (17) and the at least one blocking receiver (47, 49) of the base body (13) in order to block the screw element (17) in the corresponding rotational position;
wherein the base body (13) has a rail (21) which extends in the direction of the longitudinal axis (L) and in which a guide section (23) of the sliding piece (15) is received and is displaceable in a guided manner; and
wherein an axis of rotation (D) about which the screw element (17) is rotatably supported extends through the rail;
wherein the rail (21) has a C-shaped section in cross-section and extends around the axis of rotation so that the axis of rotation extends within the C-shape;
wherein the guide section of the sliding piece has protrusions that are received in recesses formed in the rail;
wherein an outer facing surface of at least one of the protrusions is guided along and contacts an inner facing surface of the recess in which the respective protrusion is received, wherein the outer facing surface faces away from the axis of rotation;
wherein the entire outer facing surface of the at least one protrusion is guided along and contacts the inner facing surface of the recess in which the respective protrusion is received.

21. A securing apparatus (11) for securing a valve lever in a set position, comprising a base body (13); a sliding piece (15); and a screw element (17),
wherein the base body (13) and the sliding piece (15) each have a clamping surface (19, 27);
wherein the sliding piece (15) is displaceably supported at the base body (13) along a longitudinal axis (L);
wherein the screw element (17) is rotatably supported at the base body (13) and has a thread (41) that is in engagement with a mating thread (43) of the sliding piece (15) so that a position of the sliding piece (15) relative to the base body (13) along the longitudinal axis (L) is restricted to a maximum spacing between the clamping surfaces (19, 27) that can be changed by a rotation of the screw element (17) in order to clamp the valve lever between the clamping surfaces (19, 27);
wherein, depending on a rotational position of the screw element (17), one of at least one blocking receiver (45) formed at the screw element (17) is aligned with one of at least one blocking receiver (47, 49) formed at the base body (13) so that a blocking element can engage into both the at least one blocking receiver (45) of the screw element (17) and the at least one blocking receiver (47, 49) of the base body (13) in order to block the screw element (17) in the corresponding rotational position;
wherein the screw element (17) has a screw head (39) comprising at least one application surface (55) that is aligned in parallel with the axis of rotation (D) about which the screw element (17) is rotatable and that is configured to be acted on by hand in a peripheral direction about the axis of rotation (D) in order to rotate the screw element (17);
wherein the application surface (55) has an engagement depression (57) in a radial end section spaced apart from the axis of rotation (D) in order to prevent a radial slipping off of a finger from the application surface (55), said finger acting on the application surface (55) in said end section in the peripheral direction; and
wherein the blocking recess (45) of the screw element (17) and the engagement depression (57) are arranged diametrically opposite one another with respect to the axis of rotation (D).

22. A securing apparatus (11) for securing a valve lever in a set position, comprising a base body (13); a sliding piece (15); and a screw element (17),
wherein the base body (13) and the sliding piece (15) each have a clamping surface (19, 27);
wherein the sliding piece (15) is displaceably supported at the base body (13) along a longitudinal axis (L);
wherein the screw element (17) is rotatably supported at the base body (13) and has a thread (41) that is in engagement with a mating thread (43) of the sliding piece (15) so that a position of the sliding piece (15) relative to the base body (13) along the longitudinal axis (L) is restricted to a maximum spacing between the clamping surfaces (19, 27) that can be changed by a rotation of the screw element (17) in order to clamp the valve lever between the clamping surfaces (19, 27);

wherein, depending on a rotational position of the screw element (17), one of at least one blocking receiver (45) formed at the screw element (17) is aligned with one of at least one blocking receiver (47, 49) formed at the base body (13) so that a blocking element can engage into both the at least one blocking receiver (45) of the screw element (17) and the at least one blocking receiver (47, 49) of the base body (13) in order to block the screw element (17) in the corresponding rotational position;

wherein the screw element (17) has a screw head (39) comprising at least one application surface (55) that is aligned in parallel with the axis of rotation (D) about which the screw element (17) is rotatable and that is configured to be acted on by hand in a peripheral direction about the axis of rotation (D) in order to rotate the screw element (17);

wherein the application surface (55) has an engagement depression (57) in a radial end section spaced apart from the axis of rotation (D) in order to prevent a radial slipping off of a finger from the application surface (55), said finger acting on the application surface (55) in said end section in the peripheral direction;

wherein the screw head (39) has a further application surface (55) that is aligned in parallel with the axis of rotation (D) and that is configured to be acted on by hand in the peripheral direction about the axis of rotation (D); wherein the at least one application surface (55) and the further application surface (55) face in mutually opposite directions; and wherein the further application surface (55) also has an engagement depression (57) in a radial end section spaced apart from the axis of rotation (D);

wherein the application surfaces (55) form side surfaces of a web (53) that is formed between the application surfaces (55) and that extends at least radially to the axis of rotation (D); and wherein a radial end section of the web (53) that is formed between said radial end sections of the application surfaces (55) is widened at both sides in the peripheral direction about the axis of rotation (D).

* * * * *